Oct. 17, 1950
W. THOMPSON ET AL
2,526,438
ADJUSTABLE HACKSAW FRAME
Filed May 18, 1945
2 Sheets-Sheet 1
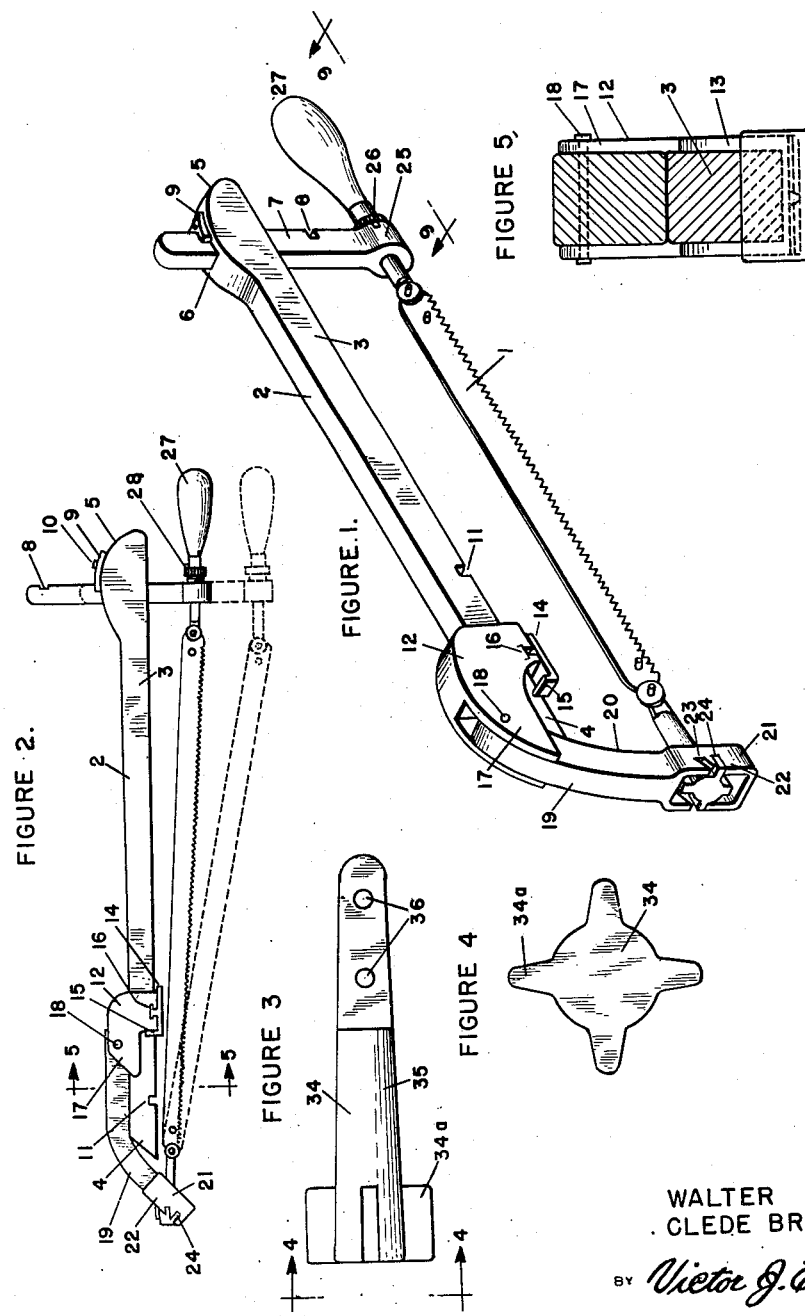
INVENTORS
WALTER THOMPSON
CLEDE BROOKS
BY Victor J. Evans & Co.
ATTORNEYS Oct. 17, 1950　　W. THOMPSON ET AL　　2,526,438
ADJUSTABLE HACKSAW FRAME
Filed May 18, 1945　　2 Sheets-Sheet 2
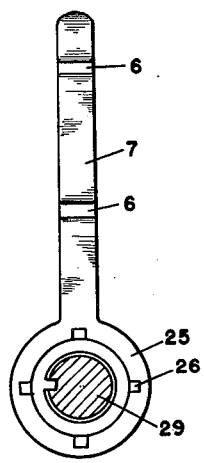
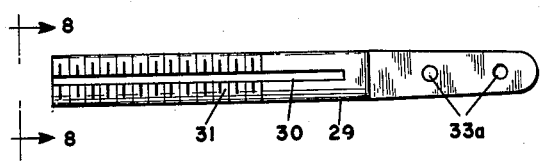
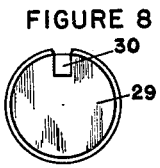
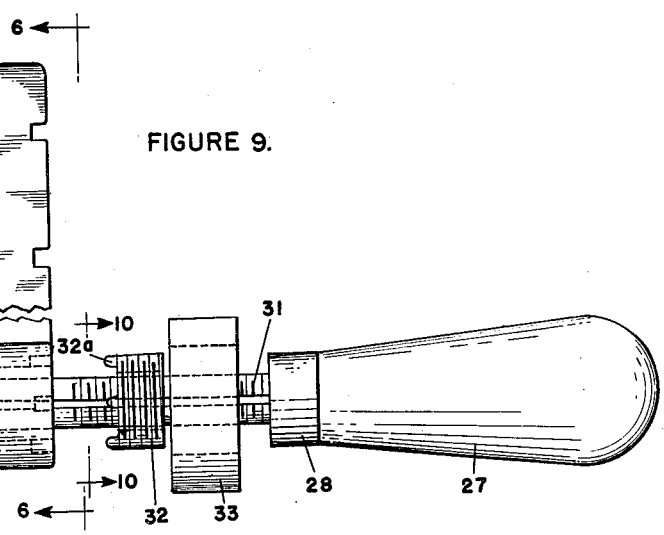
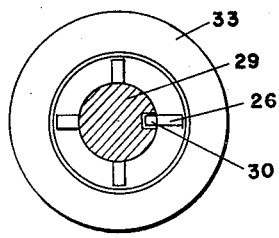
INVENTOR.
WALTER THOMPSON
CLEDE BROOKS
ATTORNEYS Patented Oct. 17, 1950

2,526,438

UNITED STATES PATENT OFFICE 2,526,438

ADJUSTABLE HACKSAW FRAME

Walter Thompson, Hamilton, and Clede Brooks, Bethel, Ohio

Application May 18, 1945, Serial No. 594,540

3 Claims. (Cl. 145—34)

Our present invention, in its broad aspect, has reference to improvements in hack saws, and more particularly, to improvements in the frames therefor, whereby a hack saw blade is properly carried in any one of several positions depending on the character of work to be done, as for instance, for use as a key hole saw, a standard hack saw, and the like. Furthermore, it is my purpose to provide a universally adjustable frame which is simple and sturdy in construction and practical in operation.

In attaining the objects and advantages of our invention, we provide a frame with an adjustable front head, and an adjustable back head and associated parts, whereby a hack saw blade supported between the two heads is adjusted and held in the most efficient and practical position with reference to the work to be done. In previous hack saws with which we are acquainted, the blade is supported parallel and spaced from the frame which is located above the blade and handle. Our present invention provides means for varying the position of the blade to the end that certain types of work may be accomplished which has been considered impossible with an ordinary hack saw—for instance, work of the type done by a key hole saw.

Other and equally important objects and advantages of my invention will be apparent from the following description and drawings, but it is emphasized that changes in the form, size, shape, construction and arrangement of parts is permissible and within the purview of my broad inventive concept, and the scope of the appended claims.

In the drawings wherein we have illustrated a preferred form of my invention—

Figure 1 is a perspective view of my device with the parts arranged to support the hack saw blade in the conventional manner.

Figure 2 is a side view showing the parts adjusted to support the hack saw blade at an angle and close to the frame as in a key hole saw; the dotted line indicating another and greater angular position of the blade.

Figure 3 is a star-head and shank for supporting the blade at the front head of the frame.

Figure 4 is an end view of the star-head taken on the line 4—4 of Figure 3.

Figure 5 is a section on the line 5—5 of Figure 2.

Figure 6 is a view of the back head support taken on the line 6—6 of Figure 9.

Figure 7 is a detail of the back head handle adjusting and blade supporting shaft.

Figure 8 is an end view of the back head handle adjusting and blade supporting shaft taken on line 8—8 of Figure 7.

Figure 9 is an enlarged detail of the adjustable back head, handle and shaft and lock nuts, and Figure 10 is a section on the line 10—10 of Figure 9.

In the drawings wherein like characters of reference designate like or similar parts throughout the several views—

The numeral 1 designates a conventional hacksaw blade, and 2 the blade frame which is formed with a main bar 3 having a beveled or angled front end 4 and a curved enlarged back end 5 formed with a slot 6 extending transversely thereof. The back head 7 is slidable in the slot 6 and has a plurality of transverse slots 8 to be engaged by the key plate or locking plate 9 to hold the back head in various adjusted positions. The key or locking plate 9 is held in place by the screw 10. The under side of the main bar 3 has a plurality of slots 11, and a curved traveler or bracket 12 which is longitudinally slotted as at 13 is slidable on the bar 3 and has a flanged key or locking plate 14, the flange 15 of which is adapted to engage any one of the slots 11 to hold the traveler or bracket in adjusted position on the bar 3. The key has a T-shaped rib 16 fitting in a T-slot in the base of traveler 12, and the traveler is bifurcated to provide arms 17 between which is pivoted as at 18 a front head 19 which is curved between its ends as at 20. The free end of the front head has a rectangular formation 21, the side walls 22 of which are provided with pairs of slots 23 and 24; the slots 24 being normally in a horizontal plane transversely of the walls 22, and the slots 23 being angular. The back head has a sleeve-like formation 25 which is provided with four diammetrically opposed notches 26.

A handle 27 having a ferrule 28 and a blade supporting and adjusting shaft 29 is provided for the operating and adjusting the hack saw, and the shaft 29 is received in the sleeve-like formation 25 and is grooved as at 30 between its ends and provided with threads 31 and a male key or lock nut 32 having ribs 32a engaging in notches 26 and a female key or lock nut 33. The end of the shaft has the hack saw blade supporting pins 33a. By turning the handle, the blade is locked in the frame. A front blade supporting shaft 34 has a star-head 34a and shank 35 with the hack saw blade supporting pins 36. The starhead fits in the slots 23 and 24 as shown in Figure 1—the horizontal slots 24 being used when the hack saw blade is supported in the normal hack saw position of Figure 1, and the angular slots 23 being used when the blade is supported angularly as shown in Figure 2. To arrange the parts of frame to support a hack saw in a key hole saw position, the front head is positioned horizontally of the bar 3 with the traveler in its rearward slot and the curved end of the front head overhanging and engaging the beveled end of bar 3 as in Figure 2. To support the blade in the dotted line position of Figure 2, the back head is adjusted downward. To support the blade in the normal position of Figure 1, the front head is swung down, and the back head adjusted downward.

From the foregoing, it is believed that the operation and advantages of our invention will be apparent, but it is again emphasized that interpretation of the scope of our invention should only be conclusive when made in the light of the subjoined claims.

We claim:

1. A hack saw, comprising a supporting frame and blade, the frame formed with a supporting bar having a beveled front end and an enlarged back end provided with a slot extending transversely thereof, an adjustable back head carried in the slot, a plurality of transverse notches formed in the rear face of said back head, a locking key carried by the enlarged back end adjacent the vertical slot therein for engagement with the notches in said back head to hold the back head in adjusted position, a curved longitudinally slotted bracket member slidably mounted on the bar for adjustment longitudinally thereof, a plurality of transverse slots formed on the underside of said supporting bar at the forward end thereof, a flanged locking key carried by the bottom edge of the bracket for holding the bracket in adjusted position by means of the engagement of the flange on said bracket with the slots formed on the underside of said supporting bar, arms formed on the front of said bracket by said slotted formation, a curved front head pivotally attached to the bracket intermediate said arms and engaging the beveled front end of the bar to be moved to different positions on adjustment of the bracket, an open rectangular formation formed on the forward end of said front head and said formation having two long sides and a short side, transverse and angular slots formed in the long sides of said formation, a front blade supporting shaft a star head formed on the forward end of said shaft and adapted to engage the slots at the forward end of said front end to adjustably mount the shaft on the front head, a blade supporting shaft adjustably mounted on the back head, and a handle on the back head blade supporting shaft.

2. The invention as defined in claim 1 wherein the back head is provided with an end formation having an opening to receive the blade supporting shaft, and locking nuts are provided on the shaft to hold the same in adjusted position.

3. A hack saw comprising a supporting frame and blade, the frame formed with a supporting bar having a bevelled front end and an enlarged back end, provided with a slot extending transversely thereof, an adjustable back head carried in the slot, a locking key mounted on the supporting bar engaging notches in said back head to hold the back head in adjusted position, a curved longitudinally slotted bracket member slidably mounted on the front end of the bar for adjustment longitudinally thereof, means carried by said bracket member coacting with means on said bar for locking said bracket on said bar after the adjustment of said bracket on said bar, a curved front head pivotally attached to the bracket and engaging the bevelled front end of the bar to be moved to different positions on adjustment of the bracket to position the blade, which is secured to said front head and said back head in angular relation to said supporting bar, blade supporting shafts for the blade, adjustably mounted on the front and back heads and a handle on one of the blade supporting shafts.

WALTER THOMPSON.
CLEDE BROOKS.

REFERENCES CITED

The following references are of record in the file of this patent:

UNITED STATES PATENTS

| Number | Name | Date |
|--------|------|------|
| 1,051,193 | Burge | Jan. 21, 1913 |
| 1,245,545 | Williams | Nov. 6, 1917 |
| 1,429,195 | Donaldson | Sept. 12, 1922 |
| 1,471,214 | Sieben | Oct. 16, 1923 |
| 2,173,365 | Kessler | Sept. 19, 1939 |
| 2,204,390 | Albright | June 11, 1940 |